(12) United States Patent
Pollman

(10) Patent No.: US 6,338,689 B1
(45) Date of Patent: Jan. 15, 2002

(54) HYDROMECHANICAL TRANSMISSION

(75) Inventor: Frederic W. Pollman, Eden Prairie, MN (US)

(73) Assignee: Sauer-Danfoss Inc., Ames, IA (US)

( * ) Notice: Subject to any disclaimer, the term of this patent is extended or adjusted under 35 U.S.C. 154(b) by 21 days.

(21) Appl. No.: 09/595,679

(22) Filed: Jun. 16, 2000

(51) Int. Cl.$^7$ ............................................. F16H 47/04
(52) U.S. Cl. ............................ 475/72; 475/80; 475/82
(58) Field of Search .............................. 475/72, 80, 82

(56) References Cited

U.S. PATENT DOCUMENTS

| | | | |
|---|---|---|---|
| 3,709,060 A | * 1/1973 | Orshansky, Jr. | 475/82 |
| 3,709,061 A | * 1/1973 | Orshansky, Jr. | 475/80 |
| 3,918,325 A | * 11/1975 | Frost | 475/82 |
| 3,969,958 A | * 7/1976 | Mijao et al. | 475/82 |
| 4,095,368 A | * 6/1978 | Saito | 446/132 |
| RE30,525 E | * 2/1981 | DeLalio | 475/82 |
| 4,306,467 A | 12/1981 | Pollman | |
| 4,341,131 A | 7/1982 | Pollman | |
| 4,429,593 A | * 2/1984 | Michael | 475/82 |
| 4,635,489 A | * 1/1987 | Imamura et al. | 475/153 |
| 5,477,791 A | * 12/1995 | Nakashima et al. | 111/105 |
| 5,931,758 A | * 8/1999 | Walter | 475/72 |
| 5,960,671 A | * 10/1999 | Nguyen | 74/397 |
| 5,980,414 A | * 11/1999 | Larkin | 475/211 |
| 6,090,005 A | * 7/2000 | Schmidt et al. | 475/5 |
| 6,257,086 B1 | * 7/2001 | Peterson | 74/425 |

* cited by examiner

Primary Examiner—Sherry Estremsky
(74) Attorney, Agent, or Firm—Zarley, McKee, Thomte, Voorhees & Sease, P.L.C.

(57) ABSTRACT

A hydromechanical transmission includes a hydrostatic transmission driven by an engine and drivingly connected to a planetary gear set. A plurality of clutches are associatable with the ring gear or elements of the planetary gear set for establishing a corresponding plurality of operating modes in which additional overall transmission speed can be achieved while reducing the power transmitted by the hydrostatic transmission. The gears of the planetary gear set can be removed and replaced with gears having a different number of teeth so as to change the overall ratio of the hydromechanical transmission without changing the power rating of the hydrostatic transmission or the size of the housing. Thus, multiple overall corner horsepower capabilities can be provided with the same hydrostatic transmission and housing package size.

12 Claims, 11 Drawing Sheets

HYDROMECHANICAL TRANSMISSION

BACKGROUND OF THE INVENTION

The present invention relates to the field of propulsion systems for vehicles. More particularly, this invention relates to a hybrid hydromechanical vehicle transmission that includes both a hydraulic transmission and a planetary gear set. The hybrid transmission has multiple modes of operation and provides greater control of corner horsepower. The hybrid hydromechanical transmission of this invention is flexible in maximum output torque, maximum output speed, and maximum corner power without the need to alter the physical layout of the gears or change the size of hydrostatic transmission.

When similar vehicles are produced with different engine power levels, they frequently have requirements for a different "corner horsepower" value. The corner power is defined by the product of the maximum output torque and maximum output speed. See the dashed lines in FIG. 10. The engine power and the required vehicle corner power normally vary somewhat in proportion, as limitations of tractive effort or vehicle speed also vary with engine power. When using gear transmissions, this may be accommodated without changing the transmission ratios as vehicle corner power is determined by the product of engine power and overall gear transmission ratio.

When using a hydraulic transmission, the vehicle corner power is defined by the product of maximum hydraulic unit torque and speed, and is usually not affected by engine power. Hydromechanical transmissions in general are discussed in U.S. Pat. No. 4,341,131 and 4,306,467. The complete disclosure of those patents is incorporated by reference herein.

There is a need for a hydromechanical transmission which provides greater flexibility and represents an improvement over the prior art. Thus, a primary objective of the present invention is the provision of an improved hydromechanical transmission.

A further objective of this invention is the provision of a hydromechanical transmission that uses the same hydraulic units and the same gear layout to achieve different hydromechanical corner horsepower outputs.

A further objective of this invention is the provision of a hydromechanical transmission that can provide at least two substantially different levels of overall corner horsepower while maintaining a constant package size for installation in a vehicle.

A further objective of this invention is the provision of a hydraulic unit and gear configuration that is flexible in maximum output torque, maximum output speed, and maximum corner power.

A further objective of this invention is the provision of a hydromechanical transmission that has a plurality of clutches that are used to establish a corresponding plurality of modes.

A further objective of this invention is the provision of a hydromechanical transmission with a compound gear set having a rotatable carrier plate assembly that has two powered output shafts extending therefrom for front and rear output.

A further objective of this invention is the provision of a hydromechanical transmission that has two centerlines and front and rear outputs.

A further objective of this invention is the provision of a hydromechanical transmission that has a space efficient layout and a simple, cost-effective gear design.

A further objective of this invention is the provision of a method of changing the overall corner horsepower of a hydromechanical transmission without changing the power rating of its hydrostatic transmission or the size of the planetary gear set housing.

These and other objectives will be apparent to one skilled in the art from the drawings, as well as from the description and claims that follow.

SUMMARY OF THE INVENTION

An improved hydromechanical transmission includes a hydrostatic transmission driven by an engine and drivingly connected to a compound planetary gear set. The hydrostatic transmission includes a variable displacement unit connected in a closed loop circuit to a fixed displacement unit. The planetary gear set includes a ring gear rotatably mounted in a housing, a carrier plate assembly with output shafts protruding therefrom, a plurality of planet gears rotatably mounted on the carrier plate assembly so that at least some engage the ring gear, and sun gears meshed with the planet gears.

A first drive gear is drivingly attached to the input shaft of the variable unit and a second drive gear is drivingly attached to the output shaft of the fixed unit. A plurality of clutches are associated with elements of the planetary gear set to establish a plurality of operating modes in which additional overall transmission speed can be achieved while reducing the power consumed by the hydrostatic transmission.

Two-mode and three-mode configurations of the hydromechanical transmission of this invention are disclosed below, as well as their operation and the method of switching between them. The gears of the planetary gear set can be removed and replaced with gears having a different number of teeth so as to change the overall ratio of the hydromechanical transmission without changing the power rating of the hydrostatic transmission or the size of the housing. Thus, multiple overall corner horsepower capabilities can be provided with the same hydrostatic transmission and housing package size.

DETAILED DESCRIPTION OF THE PREFERRED EMBODIMENTS

Figure 1:
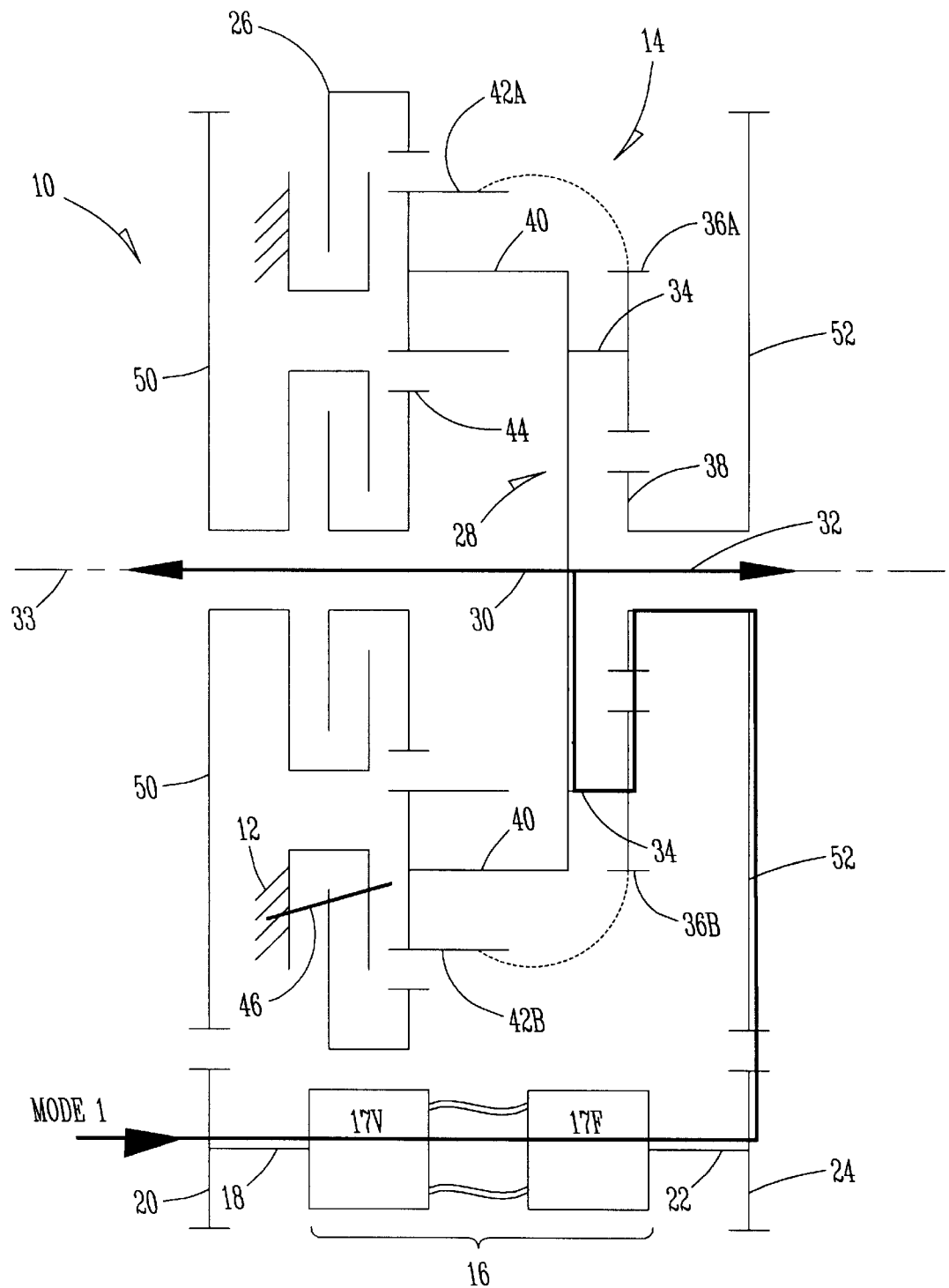
FIG. 1 is a schematic representation of the two-mode configuration of the hydromechanical transmission of the present invention in its first mode.

In the figures and the description that follows, the hydromechanical transmission of this invention can be configured in at least two different ways, generally designated by the reference numerals 10 and 10A respectively. In the two-mode configuration of the invention shown in FIGS. 1 and 2, the hydromechanical transmission 10 of this invention includes a housing 12 in which a compound planetary gear set 14 is mounted. The hydraulic portion of the transmission 10 includes a hydrostatic transmission 16. The hydrostatic transmission (HST) 16 includes a variable displacement hydraulic unit 17V (pump) fluidly connected in a closed loop circuit to a hydraulic unit 17F. Preferably hydraulic unit 17F is a fixed displacement unit sometimes referred to as a motor. The variable unit 17V has an input shaft 18 connected to a source of rotational power, such as a conventional engine (not shown). The input shaft 18 drivingly connects to a first drive gear 20. The fixed displacement 17F has an output shaft 22 that drivingly connects to a second drive gear 24. The input shaft 18 and the output shaft 22 may share the same centerline, although other arrangements are also possible without significantly detracting from the invention. The hydrostatic unit 16 and the planetary gear set 14 can also be mounted in the same housing 12 yet have different centerlines.

Figure 6:
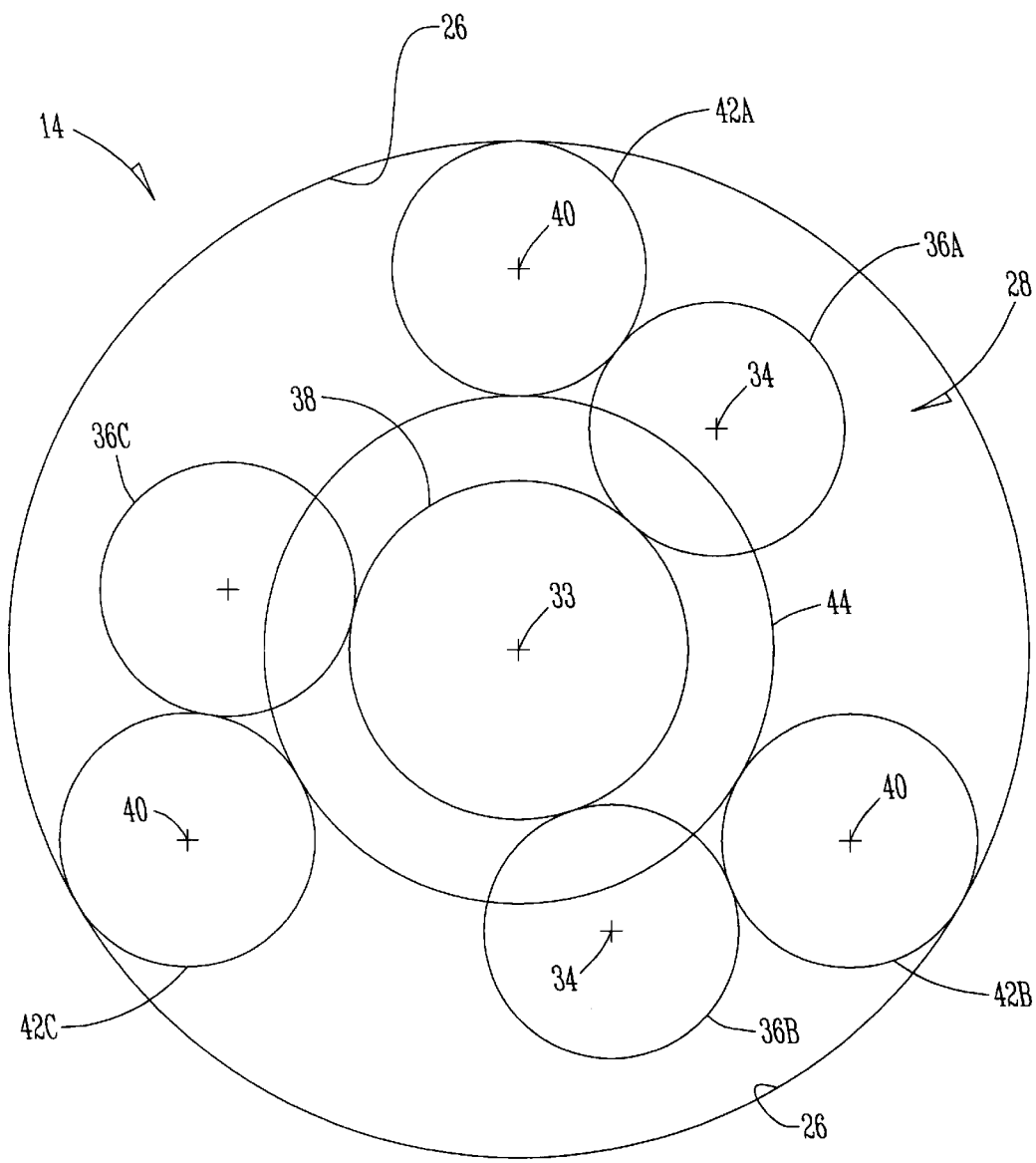
FIG. 6 is a schematic representation showing the compound planetary gear set layout of this invention in greater detail.
Figure 7:
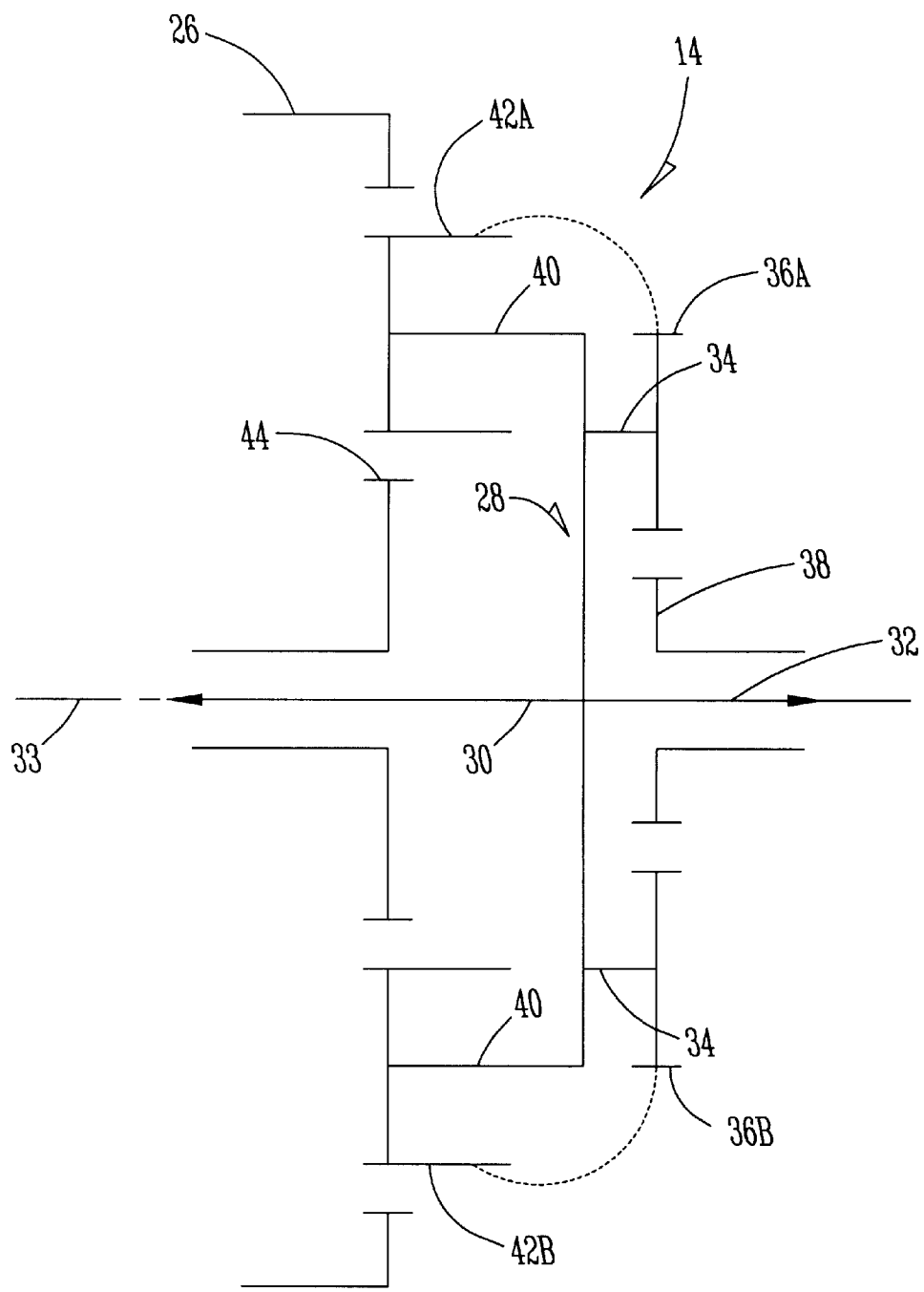
FIG. 7 is a schematic representation focusing on the planetary gear set layout of this invention.

FIGS. 6 and 7 show the planetary gear set 14 in greater detail. As best seen in FIG. 7, the planetary gear set 14 has a ring gear 26 and carrier plate assembly 28 rotatably mounted in the housing 12. The carrier plate assembly 28 has oppositely directed, centrally located power output shafts 30, 32. Together, the output shafts 30, 32 define an axis of rotation 33. The axis of rotation of the gear set 14 is offset from the centerline of the input shaft 18 and output shaft 22 of the hydraulic units. As is conventional, the carrier plate assembly 28 includes opposing plates that have outwardly directed opposing surfaces from which the output shafts 30, 32 extend.

A plurality of radially and angularly spaced pins 34 extend from one of the outwardly directed opposing surfaces. Each of the pins 34 is generally parallel to the axis of rotation 33. A plurality of planetary gears 36A, 36B, 36C rotatably mount on the pins 34. As is conventional, the planetary gears 36A, 36B, 36C are generally cylindrical and have an outer diameter with a plurality of gear teeth thereon. Together the gears 36A, 36B, 36C engage and support a sun gear 38 between them. The sun gear 38 is rotatably mounted on the output shaft 32.

Another plurality of radially and angularly spaced pins 40 extend from the other of the outwardly directed opposing surfaces. The pins 40 are generally parallel to the axis of rotation 33. A second plurality of planetary gears 42A, 42B, 42C rotatably mount on pins 40. The planetary gears 42A, 42B, 42C are generally cylindrical and have an outer diameter with a plurality of gear teeth thereon. The gear teeth on each gear 42A, 42B, 42C simultaneously engage the gear teeth on an adjacent respective planetary gear 36A, 36B, 36C and the gear teeth on the inside diameter of the ring gear 26. Furthermore, the gear teeth on the planetary gears 42A, 42B, 42C mesh with a sun gear 44 that is supported between them. The sun gear 44 slidably mounts on the output shaft 30. FIG. 6 illustrates the meshing of the gears of the planetary gear set. As is known in the art of planetary gear sets, the carrier plate assembly 28 has voids and clearance holes where needed to allow for the corresponding gears 36A, 36B, 36C and 42A, 42B, 42C to mesh respectively with each other and to reduce the weight of the assembly. The dashed lines connecting gears 36A, 36B, 36C and 42A, 42B, 42C in FIG. 7 indicate that these gears mesh with each other.

Figure 2:
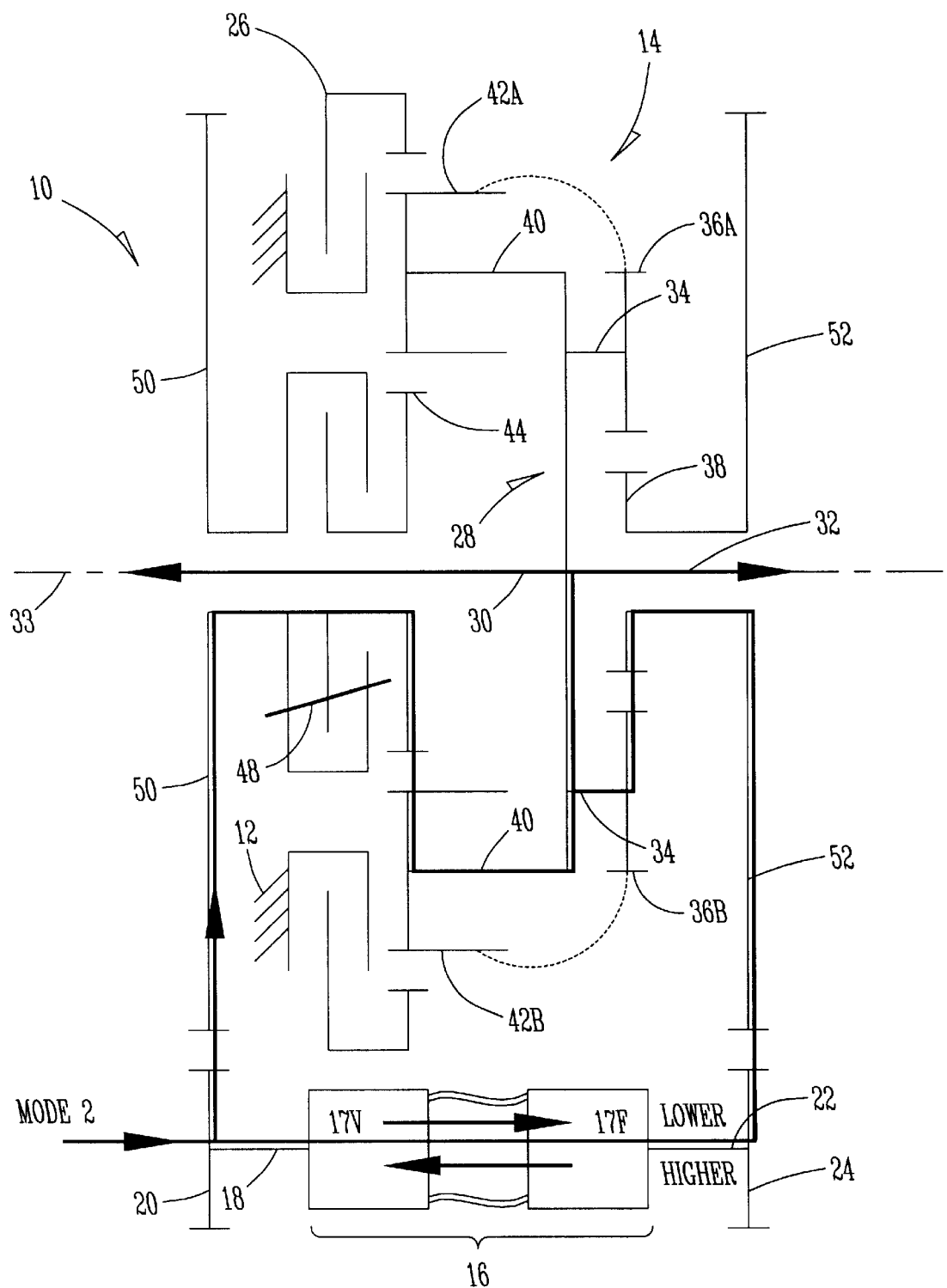
FIG. 2 is schematic representation of the two-mode configuration of the hydromechanical transmission of the present invention in its second mode.

Two clutches are operatively associated with the planetary gear set 14 in the two-mode transmission configuration shown in FIGS. 1 and 2. A first clutch 46 selectively connects the ring gear 26 to the housing 12, thereby fixing the ring gear 26 to the housing 12 and preventing the ring gear 26 from rotating relative to the housing 12. Thus, the first clutch 46 acts as a brake for the ring gear 26.

A second clutch 48 selectively connects the sun gear 44 to the first drive gear 20 through a first intermediate gear 50. A similar second intermediate gear 52, preferably identical in terms of number of teeth and pitch diameter, interconnects the second drive gear 24 with the sun gear 38. When the second clutch 48 is engaged, the sun gear 44 is rotated at the speed of gear 50. Ideally the clutches 46, 48 are synchronous clutches or at least near synchronous clutches. Thus clutches 46, 48 can be engaged or disengaged without changing the output speed ratio. Preferably, the clutches 46, 48 are disposed on the axis of rotation 33.

In operation, the two-mode configuration of this invention allows for selection between two power paths, as best seen in view of FIGS. 1 and 2. In FIG. 1, the clutch 46 is engaged by the operator and the ring gear 26 is prevented from rotating relative to the housing 12. The engagement of the clutch 46 is indicated by the dark angled line drawn through the clutch. Power in mode 1 is transmitted from the engine to the variable unit 17V, which converts the rotational energy to fluid energy and thereby causes the fixed hydraulic unit 17F to rotate its output shaft 22. The second drive gear 24 attached to the output shaft 22 rotates, driving the sun gear 38 through the intermediate gear 52. The sun gear 38 rotates the first planet gears 36A, 36B, 36C, which act as idlers that counter-rotate to drive the second planet gears 42A, 42B, 42C in the same direction of rotation as sun gear 38. Because the ring gear 26 cannot rotate in response to the rotation of the second planet gears 42A, 42B, 42C, the carrier plate assembly 28 rotates instead. This causes the power output shafts 30, 32 to rotate.

Figure 8:
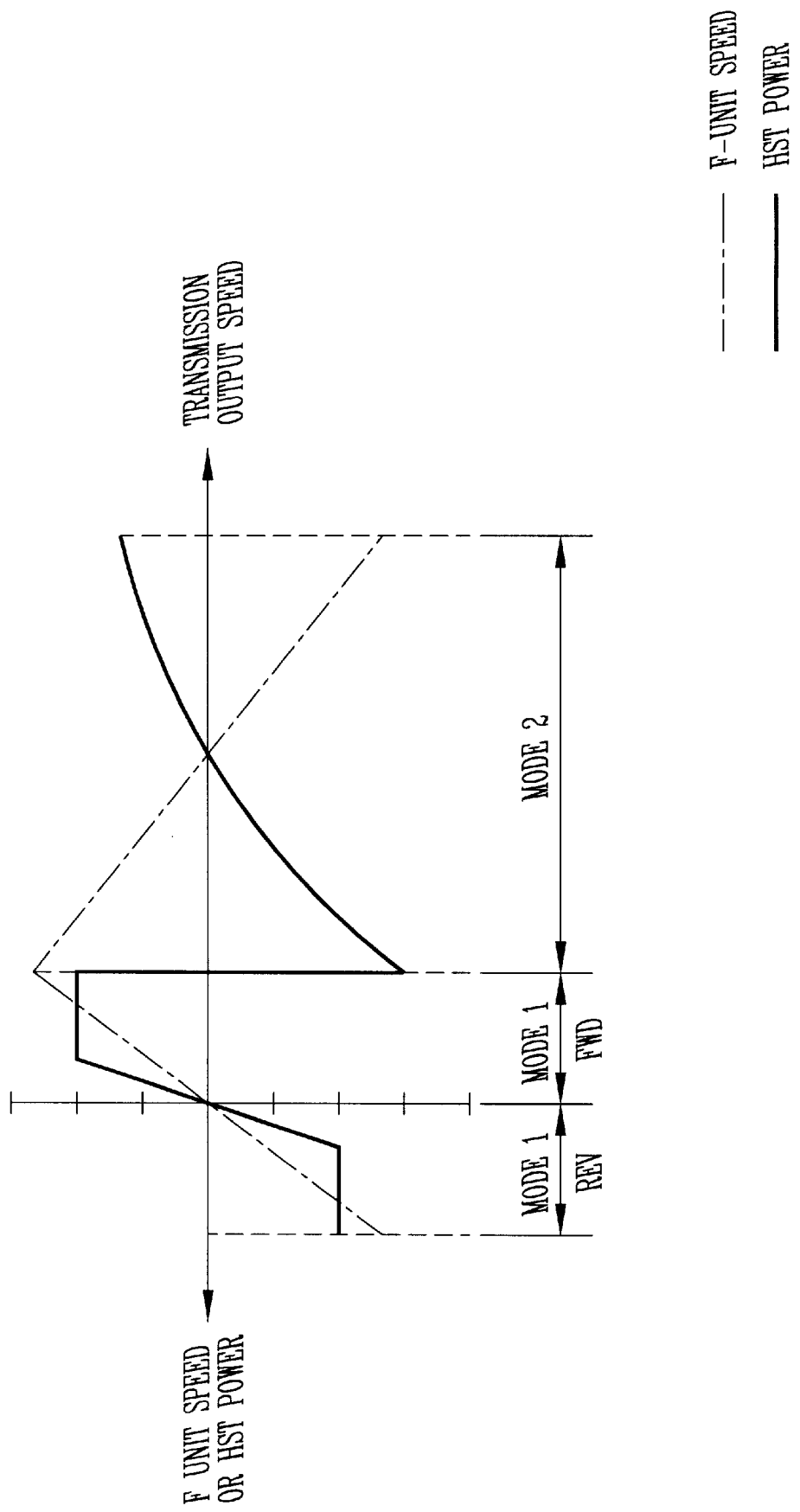
FIG. 8 is a graph of overall transmission output speed versus hydrostatic power and fixed unit speed for the two-mode configuration of this invention.
Figure 11:
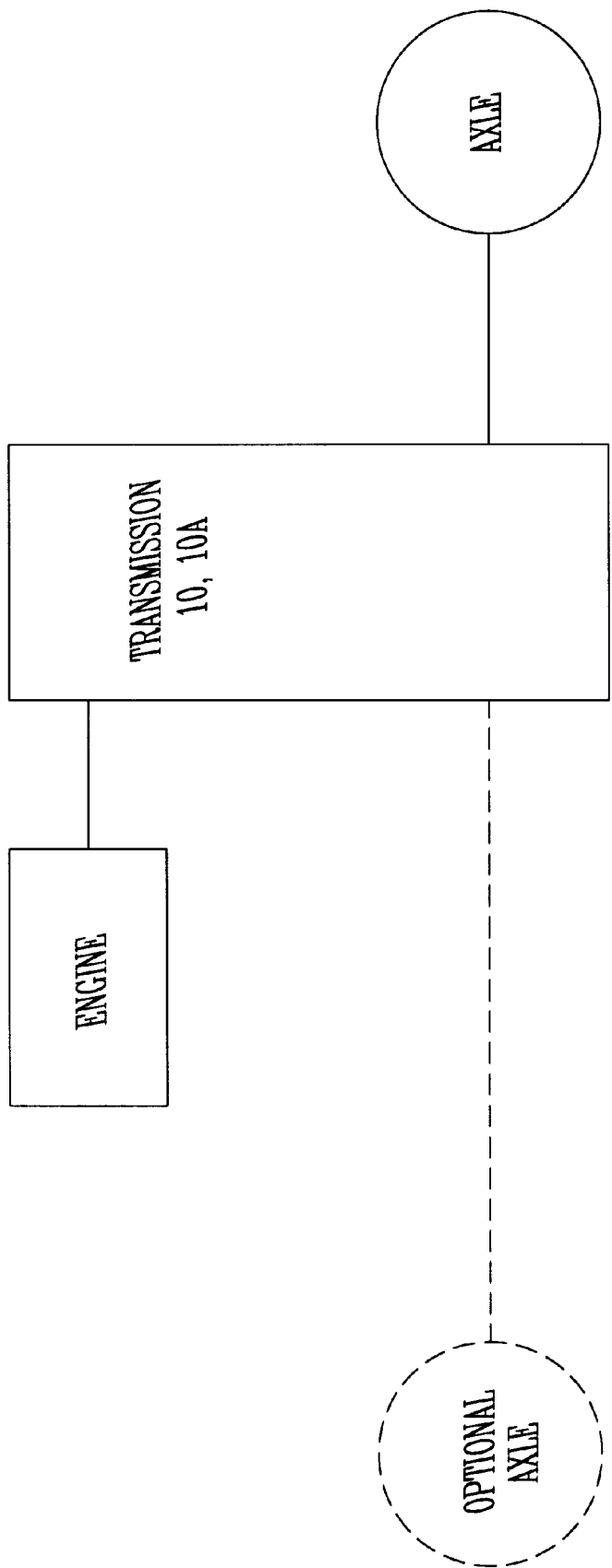
FIG. 11 is a diagram illustrating how the invention can be used to supply power to an optional second axle for a 4-wheel drive.

The two rotating power output shafts 30, 32 can be used for two-wheel drive of a vehicle or can be used for front and rear axle drives in a four-wheel vehicle. See FIG. 11. As shown in the graph of FIG. 8, mode 1 is available in both forward and reverse directions of vehicle travel. The variable displacement pump 17V is merely stroked in an opposite direction so that fluid is pumped in a different direction around the closed loop circuit.

FIG. 2 shows the power path for mode 2, in which the first clutch 46 is disengaged and the second clutch 48 is engaged. The engine rotates the input shaft 18 of the variable unit 17V and the attached first drive gear 20. The first drive gear 20 rotates the first intermediate gear 50, which is now drivingly connected to the second sun gear 44 by the clutch 48. The sun gear 44 then rotates at a speed that is proportional to the engine speed.

Meanwhile, the hydrostatic transmission 16 is also driven by the engine and rotates the second drive gear 24 at a given speed that depends on the commanded displacement of the variable unit 17V. The intermediate gear 52 rotates the sun gear 38, which drives the planet gears 36A, 36B, 36C. Because the planet gears 36A, 36B, 36C are meshed with planet gears 42A, 42B, 42C, as is the ring gear 26. The carrier plate assembly 28 is continuously driven at a speed that is dependent on the displacement of the variable unit 17V.

Thus, the carrier assembly and the output shafts 30, 32 attached thereto rotate at a speed that is a function of both the input speed and displacement ratio of the hydrostatic transmission. The operator can increase the speed of the overall hydromechanical transmission 10 at the power output shafts 30, 32 without consuming additional hydrostatic transmission power by shifting the hydromechanical transmission 10 from mode 1 to mode 2. See the graph of FIG. 8. At low output speeds, the fixed unit 17F actually functions as a pump and the variable unit 17V acts as a motor. Thus, the hydrostatic (HST) power dips into the negative area of FIG. 8. At higher output speeds, the fixed unit passes through a zero displacement position (neutral) and reverses direction such that the HST power becomes positive again. Greater overall speed is attainable by the hydromechanical transmission 10 in mode 2, without consuming as much HST power.

In mode 1, the maximum amplitude of the HST power curve is limited by the full stroke displacement of the variable unit 17V at the maximum input or engine speed in rpm. The fixed unit speed shown as F-unit speed in FIG. 8 is proportional to the speed of the sun gear 38. The HST power is proportional to the displacement of the variable unit 17V and the hydrostatic pressure.

Figure 3:
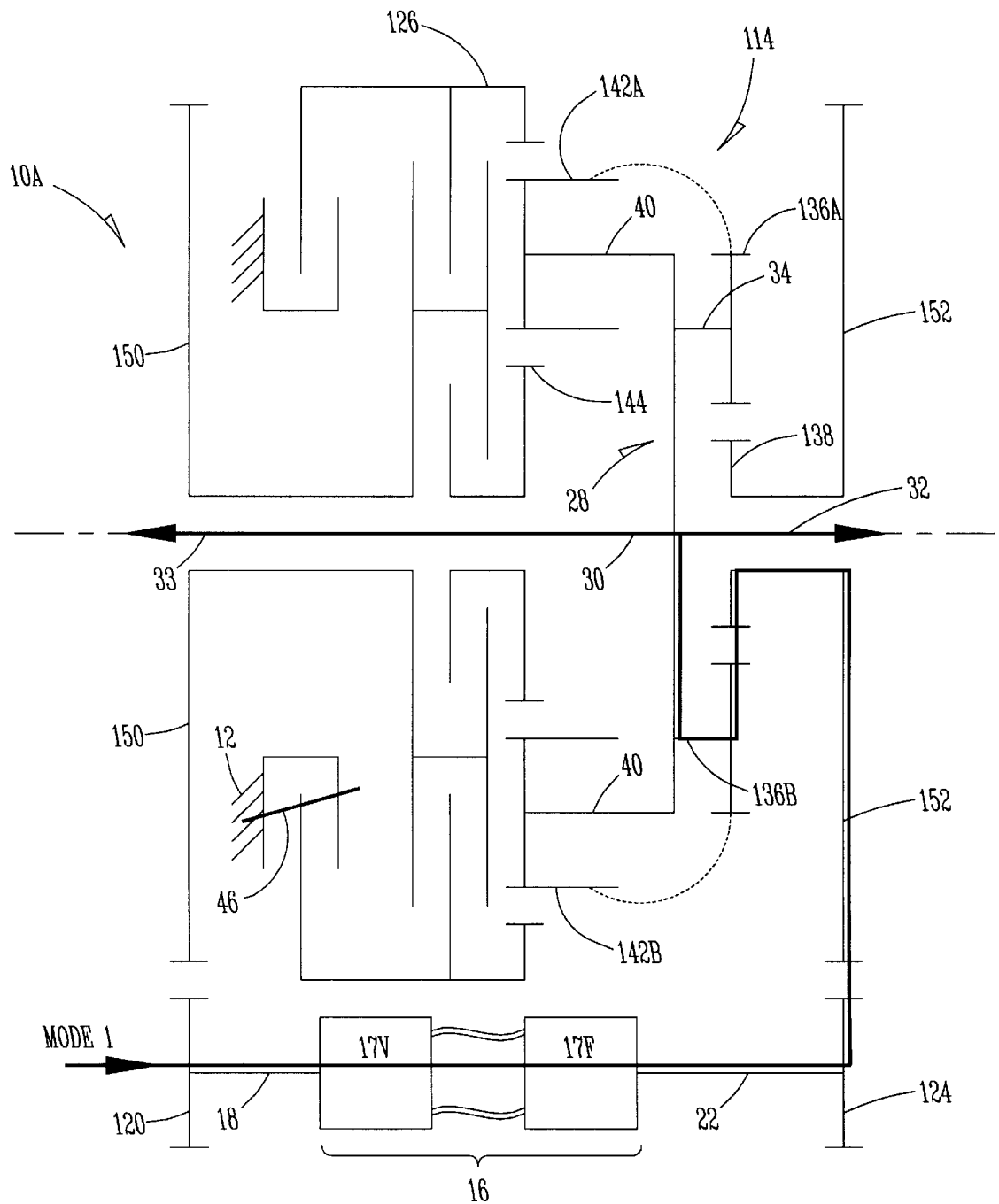
FIG. 3 is a schematic representation of the three-mode configuration of the hydromechanical transmission of this invention in its first mode.
Figure 4:
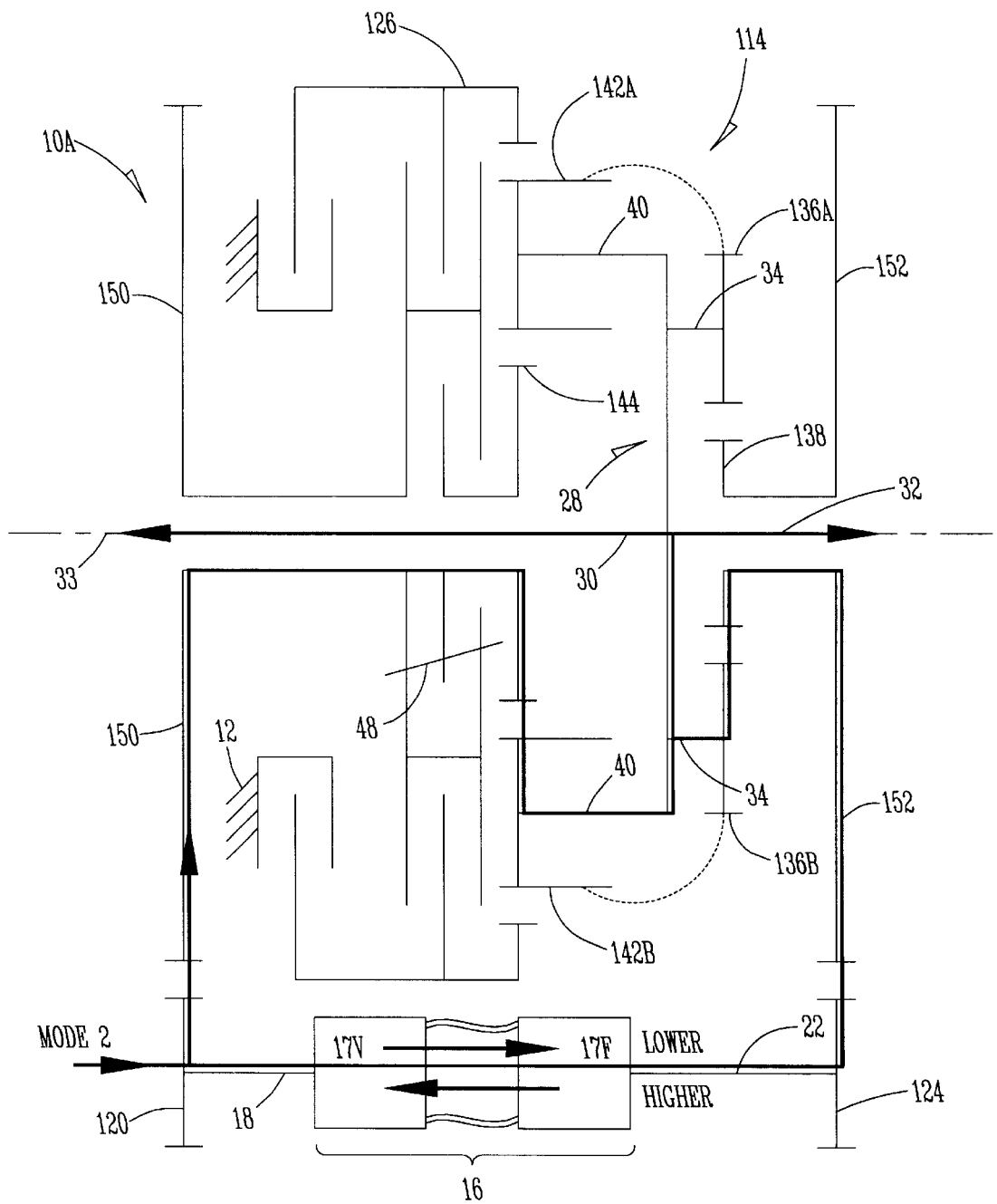
FIG. 4 is a schematic representation of the three-mode configuration of the hydromechanical transmission of this invention in its second mode.
Figure 5:
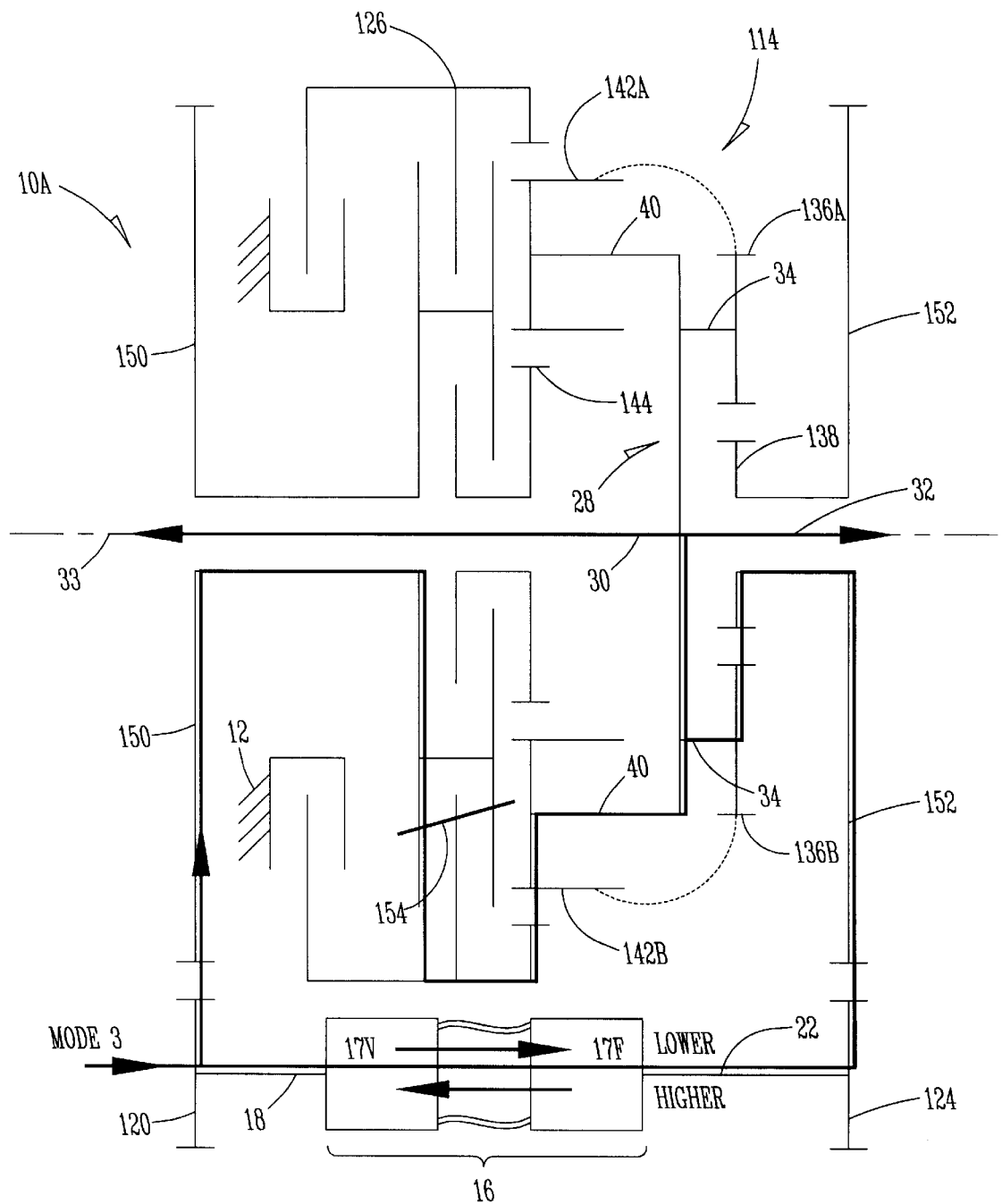
FIG. 5 is a schematic representation of the three-mode configuration of the hydromechanical transmission of this invention in its third mode.
Figure 9:
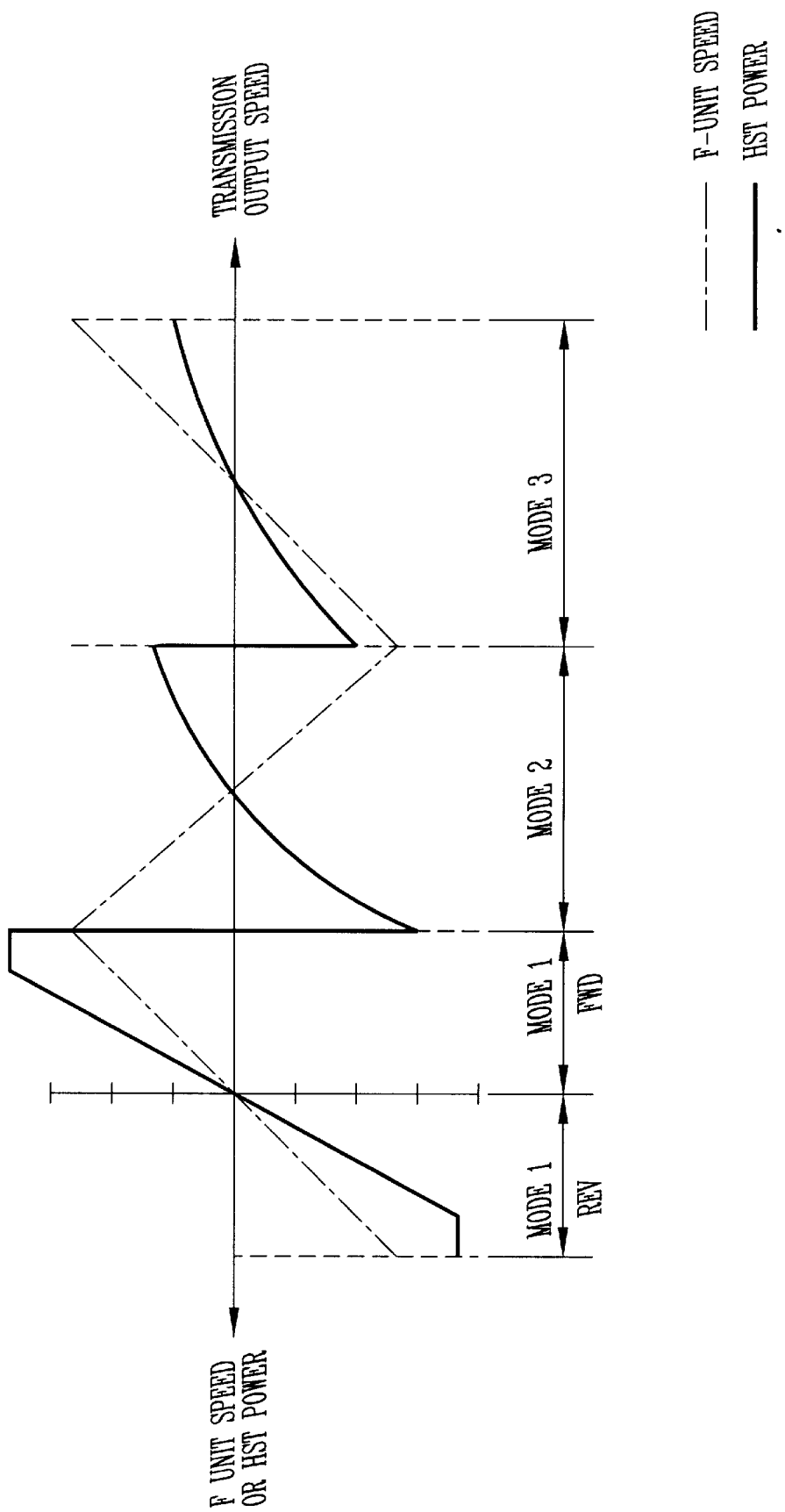
FIG. 9 is a graph similar to FIG. 8 but illustrates the three-mode configuration.
Figure 10:
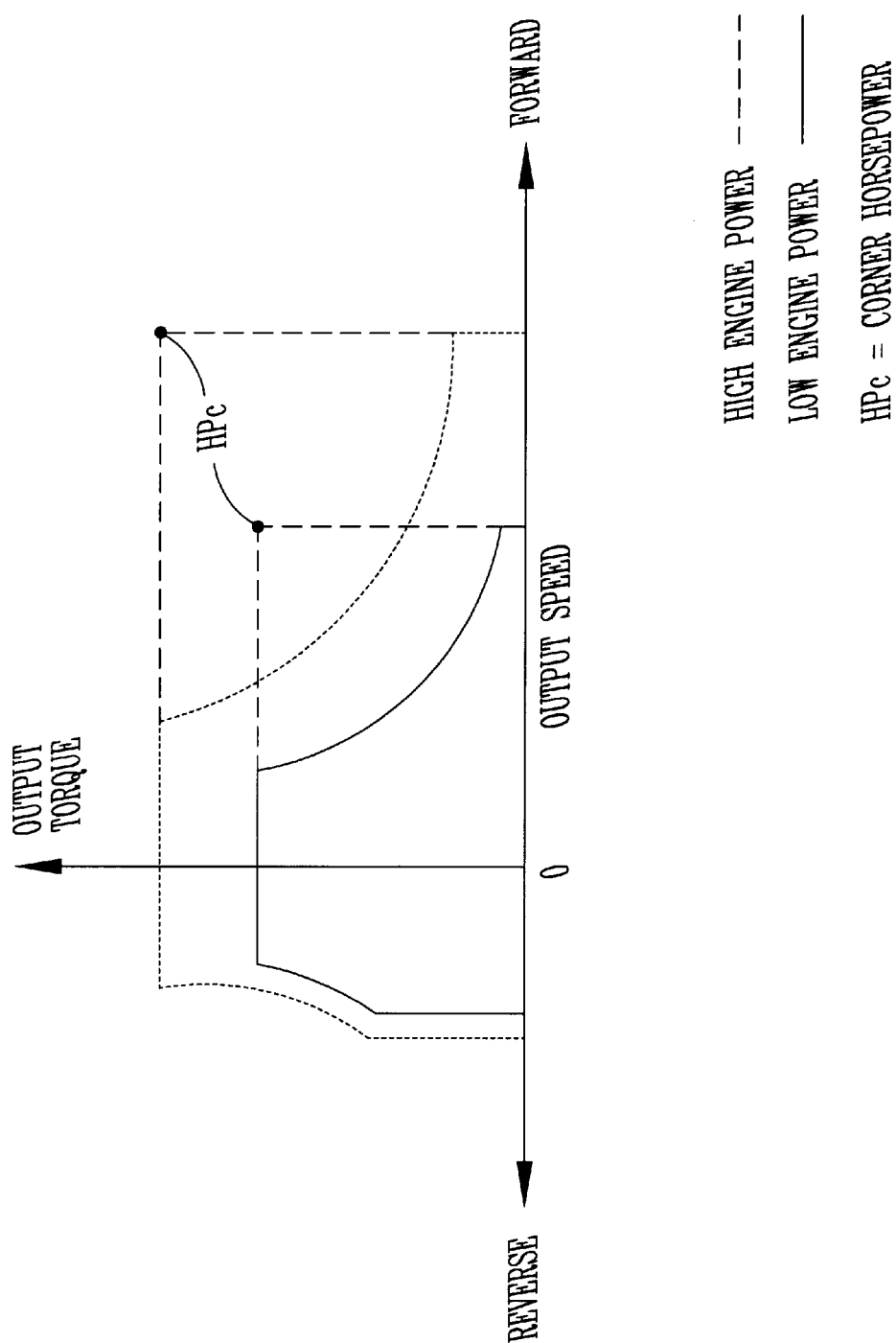
FIG. 10 is a graph illustrating output torque versus output speed.

FIGS. 3–5 and 9 illustrate another configuration of this invention that provides a three-mode hydromechanical transmission 10A. A new gear set 114 is formed in the same housing 12 by physically replacing some of the gears (26, 32A, 32C, 42A, 42B, 42C, 38, 44) in the planetary gear set 14 with gears (126, 132A, 132B, 132C, 142A, 142B, 142C, 138, 144) to alter the ratios of the gears. The number of teeth or pitch diameter of at least some of the latter gears are different than the former gears so that the gear ratios within the planetary gear set change. A third clutch 154 interconnects the ring gear 126 with the first drive gear 120 through the first intermediate gear 150. Preferably, the third clutch 154 is disposed on the axis of rotation 33. When the operator engages clutch 154 while the other two clutches 46, 48 are disengaged, a third mode of the transmission 10A results, as shown in FIG. 9. FIGS. 3 and 4 show the transmission 10A with the third clutch 154 disengaged and are quite similar in structure and operation to the previously described two mode or clutch configuration of FIGS. 1 and 2. FIGS. 3–5 depict the power paths and clutch statuses of the three modes.

As best seen in view of FIG. 9 and FIGS. 3–5, the operation of the three-mode transmission is similar in some respects to the operation of the two mode configuration. However, as can be seen by comparing FIGS. 8 and 9, mode 2 of the transmission does not result in as high of a transmission output speed as mode 2 in the two mode configuration. Instead, mode 2 is compressed due to the alteration of gear ratios in the planetary gear set. The third clutch 154 is engaged when the F-unit speed reaches its maximum negative amplitude and the output speed of the overall transmission 10A increases. Modes 1, 2 and 3 require progressively less hydrostatic transmission power. Greater output speed is achieved with the same gear layout and hydrostatic transmission. The additional output speed (and horsepower) is accomplished by merely altering the gear ratios and adding another clutch 154 between the ring gear 126 and the first intermediate gear 150, which is connected to the first input gear 120 and input shaft 18.

Of course, the invention is not limited to particular input power values, output torque, output speed, or gear ratios, but the example described above illustrates a combination possible with the invention. Pertinent values for the 2 mode and 3 mode configurations of the transmission described above are shown below:

2 mode:

Input (engine) rpm=7000

Input Power from engine=15 HP

R=Drive/Intermediate=4.0

$K_1=R_1/S_1=4.75$ $K_2=R_1/S_2=-2.75$

Output Torque T at two output shafts=325 ft-lb

Output Speed N=1750 rpm at two output shafts

Overall Corner Power=TN(12/63025)=108 HP 3 mode:

Input (engine) rpm=7000

Input Power=28 HP

R=Drive/Intermediate Ratio=5.8

$K_1=S_1/R_1=3.5$ $K_2=R_1/S_2=-1.5$

Output Torque T=325 ft-lb

Output Speed N=2400 rpm

Overall Corner Power=TN(12/63025)=148 HP

Where:

$S_1$ is the number of teeth or the pitch circle diameter of the first sun gear 38 or 138;

$S_2$ is the number of teeth or the pitch circle diameter of the second sun gear 44 or 144;

R is the effective ratio between the first drive gear 20 or 120 and the first intermediate gear 50 or 150 (when the first and second drive gears are the same size and the first and second intermediate gears are the same size, as shown in the figures, this is also the effective ratio between the second drive gear 24 or 124 and the second intermediate gear 52 or 152);

$R_1$ is the number of teeth or the pitch circle diameter of the ring gear 26 or 126;

$K_1$ is the ratio of the first sun gear $S_1$ to the ring gear $R_1$; and $K_2$ is the ratio of the ring gear $R_1$ to the second sun gear $S_2$.

The signs of $K_1$ and $K_2$ indicate whether the gears rotate in the same direction (+) or counter-rotate (−).

Thus, it can be seen that the present invention at least accomplishes its stated objectives.

In the drawings and specification, there have been set forth preferred embodiments and examples relating to the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A variable ratio hydromechanical transmission for propelling a vehicle, comprising:

a hydrostatic transmission having a given corner horsepower and including a variable displacement hydraulic unit with a shaft connected to a source of rotational power and drivingly connected to a first drive gear, a fixed displacement hydraulic unit fluidly connected to the variable displacement hydraulic unit in a closed loop circuit and having a shaft drivingly connected to a second drive gear;

a compound planetary gear set including a rotatable ring gear mounted in a housing of a given size, a carrier plate assembly rotatably mounted in the ring gear, and four gear elements rotatably and removably mounted on the carrier plate, the four gear elements including a first sun gear having given number of teeth thereon and being driven by the second drive gear, a first planetary gear having a given number of teeth thereon for mating with the first sun gear, a second sun gear connectable to the first drive gear and having a given number of teeth thereon, and a second planetary gear having a given number of teeth thereon for simultaneously mating with the first planetary gear, the ring gear and the second sun gear;

the carrier plate assembly including oppositely directed centrally located power output shafts rigidly mounted thereto and extending to define an axis of rotation;

the planetary gear set defining gear ratios $K_1$ and $K_2$; $K_1$ having a numerator equal to the number of teeth on the ring gear and a denominator equal to the number of teeth on the first sun gear; $K_2$ having a numerator equal to the number of teeth on the ring gear and a denominator equal to the number of teeth on the second sun gear;

a first clutch for selectively fixing the ring gear to the housing so as to prevent rotation of the ring gear relative to the housing and thereby act as a brake;

a second clutch selectively connecting the first drive gear to the second sun gear;

at least one of the ratios $K_1$ and $K_2$ of the planetary gear set being changeable by removing one of the four gear elements and replacing the removed element with another element having a number of teeth thereon that is different from the number of the removed element without changing the size of the housing and the corner horsepower of the hydrostatic transmission.

2. The hydromechanical transmission of claim 1 comprising a third clutch for selectively fixing the ring gear to the first drive gear.

3. The hydromechanical transmission of claim 2 wherein the first clutch, the second clutch, and the third clutch are mounted in the housing along the axis of rotation of the output shafts.

4. The transmission of claim 2 wherein the third clutch is a synchronous clutch.

5. The transmission of claim 2 wherein the variable unit and fixed unit are disposed on a first centerline and the first clutch, second clutch, third clutch and the output shafts of the planetary gear set all are disposed on a second centerline.

6. The transmission of claim 1 wherein each of the first drive gear and the second drive gear includes a diameter with gear teeth thereon and are identical in the diameter and the number of gear teeth thereon.

7. The transmission of claim 1 comprising a first intermediate gear drivingly interconnecting the first drive gear and the second sun gear, and a second intermediate gear drivingly interconnecting the second drive gear and the first sun gear, the first intermediate gear and the second intermediate gear each having a diameter with a plurality of teeth thereon for engaging the gear teeth on the first drive gear and the second drive gear respectively.

8. The transmission of claim 1 wherein the first clutch and second clutch are synchronous clutches.

9. The transmission of claim 1 wherein the fixed unit and the variable unit are disposed in the housing of the planetary gear set.

10. The transmission of claim 1 wherein the variable unit and fixed unit are disposed on a first centerline and the output shafts of the planetary gear set are disposed on a second centerline defined by the axis of rotation of the output shafts.

11. The transmission of claim 10 wherein the first clutch and the second clutch are disposed on the second centerline.

12. A method for altering the overall corner horsepower of a hydromechanical transmission in a vehicle, the steps of the method comprising:

providing a hydrostatic transmission of a given maximum power rating and including a variable displacement hydraulic unit connected in a closed hydraulic loop to a fixed displacement hydraulic unit; the variable displacement unit including an input shaft and the fixed displacement unit including an driven shaft;

connecting a four element planetary gear set in a housing occupying a fixed exterior volume to the driven shaft; the planetary gear set including removable gears that together with a ring gear rotatably mounted in the housing define two initial gear ratios $K_1$ and $K_2$;

providing a first clutch in the gear set for selectively fixing the ring gear to the housing when the first clutch is engaged to define a first mode of the hydromechanical transmission having a given output speed capacity;

providing a second clutch in the gear set for selectively connecting one of the removable gears to the input shaft when the first clutch is disengaged and the second clutch is engaged so as to define a second mode of the hydromechanical transmission having a given output speed capacity that is higher than the output speed capacity of the first mode;

adding a third clutch to the gear set so as to define a third mode of the hydromechanical transmission when the first clutch and the second clutch are disengaged and the third clutch is engaged, the third mode having a given output speed capacity that is higher than the output speed capacity of the second mode; and removing at least one element of the planetary gear set and replacing the removed element with another element so as to alter one of the two initial gear ratios $K_1$ and $K_2$;

whereby the overall corner horsepower of the hydromechanical transmission is altered without changing the maximum power of the hydrostatic transmission and without increasing the fixed exterior volume of the housing.

* * * * *